Rider & Bird,
Manf. Hose.
No. 109,448.　　Patented Mar. 1, 1870.

United States Patent Office.

JOHN P. RIDER AND JAMES R. BIRD, OF BROOKLYN, NEW YORK, ASSIGNORS TO "THE NEW YORK RUBBER COMPANY."

Letters Patent No. 100,448, dated March 1, 1870.

IMPROVEMENT IN COVERING THE ENDS OF RUBBER HOSE.

The Schedule referred to in these Letters Patent and making part of the same.

*To whom it may concern:*

Be it known that we, JOHN P. RIDER and JAMES R. BIRD, both of Brooklyn, in the county of Kings, and State of New York, have invented certain new and useful Improvements in Covering and Protecting the Ends of Vulcanized India-Rubber Hose; and we hereby declare the following to be a full, clear, and exact description of the same, reference being had to the accompanying drawing, in which—

Our improvement is designed not only to protect the ends of the hose from all contact with moisture, thus avoiding the capillary action of the duck or canvas which enters into the composition of the hose, but also to prevent the inner end of the metallic coupling-shank, or that portion of the coupling-shank which is fitted inside the hose, from wearing the inner rubber tube or lining of the hose; and to this end Our invention consists of a combined cap and protecting-tube, the cap being designed to fit over upon the exposed ends of the hose and keep them from contact with moisture, and the protecting-tube forming in effect a continuation of the cap, and extending upon the inside of the hose a sufficient distance back of the end to protect the inner rubber-hose lining, and remove it from all contact with the metallic coupling-shank.

The manner in which our invention is or may be carried into effect will be readily understood by reference to the accompanying drawing.

Figure 1:
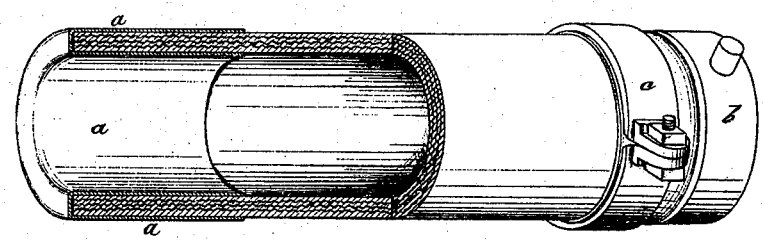
Figure 1 is a view, partly in section, of a portion of hose made in accordance with our invention.

In fig. 1 the covering and protecting device consists of a loose tube, $a$, of vulcanized rubber, which is made separate from, but so as to have the same diameter as the internal diameter of the hose. One end of this tube is inserted in the hose, so as to extend therein the length of the coupling-shank; and the portion of the tube which still projects from the hose is turned "inside out" over the end of the hose, and upon the outside of the same, where it may be confined in place by rubber cement, or by the band, wire, or other device employed to fasten the coupling to the hose; or the tube may be first fitted upon the outside of the hose, and the projecting portion may be tucked in.

In applying the coupling $b$, its shank is inserted in the hose, which is protected by the inner portion of the tube $a$, so as to be entirely removed from contact with the coupling.

The tube $a$ is bound and held firmly in place upon the inside by the coupling-shank, and upon the outside by the band $c$, or other suitable means; and thus the ends of the hose are fully protected, as well also as the inner hose-lining.

Figure 2:
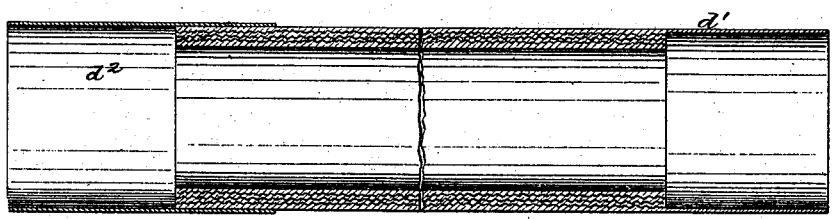
Figure 2 is a longitudinal section of a modified form of the same.

Instead of using a loose tube, as just described, we can accomplish the same results in the manner shown in fig. 2, by extending the rubber coating of the hose $d^1$, or by attaching a tube, $d^2$, of thin rubber to the end of the rubber coating before vulcanization, thus producing a projecting tube which would in reality form a prolongation of the outer coating. In this case, as in the other, the tube is of sufficient length to completely cover the ends of the hose, and to extend inside the full length of the coupling-shank.

Still another mode of accomplishing the same results is, to employ a loose tube of the proper length made in but not attached to the inside of the hose, and then brought over the end and attached only to the outside of the hose before vulcanization.

Figure 4:
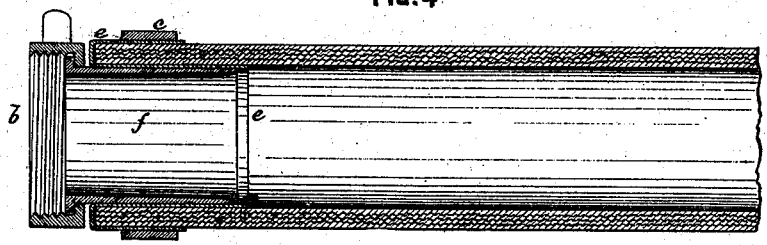

This modification is shown in fig. 4, where $e$ is the protecting-tube placed inside the hose, but not attached to the inner lining, and then turned over the end and upon the outside of the hose before the vulcanization of the same, so that it may be attached by the vulcanizing process. The tube in this case, as in others, extends inside the hose the full length of the coupling-shank $f$.

Figure 3:
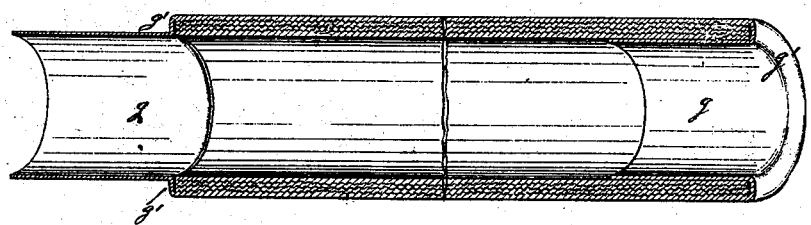
Figures 3 and 4 are like sections of other modifications of the hose.

Another method of arranging the protecting-tube is shown in fig. 3. In this instance the tube $g$ is vulcanized in such form and shape as to cover, but not be attached to the end of the hose. This is effected by shaping the end $g'$ of the tube nearest the hose so that it shall extend over the face of, but not be attached to the end of the hose. The end $g'$ is then attached to the hose-coating, and the remaining portion of the tube is formed upon the mandrel in the usual manner. The tube then forms part of the hose, and as it is shaped and applied to the hose before vulcanization, a paper or other suitable flat ring, or soapstone, or any other disk is interposed between the part $g'$ and the end of the hose, so as to prevent the two from sticking together. After the vulcanizing, the paper ring, soapstone, &c., can be removed or torn away.

Other methods of combining the tube with the hose may be employed; as, for instance, the tube may be attached to the inside instead of the outside of the hose. But we have here described those which we have found by careful experiment and trial to be the most practicable.

In all instances, it will be noticed that the tube is made and combined with the hose in such manner as to permit the end of the hose being exposed to view and inspected whenever it is desired to ascertain the quality of the hose and the number of plies of duck or canvas which enter into its composition.

Having now described our invention, and the manner in which the same is or may be carried into effect,

What we claim, and desire to secure by Letters Patent, is—

1. The combination, with the ends of vulcanized India-rubber hose, of an elastic and water proof tube applied to the same, so as to cover the end and extend inside the hose the full length of the coupling-shank, substantially as shown and set forth.

2. As a new manufacture, vulcanized India-rubber hose provided at the end with a vulcanized rubber tube, arranged so as to cover the end and extend upon the inside of the hose far enough to remove the hose-lining from contact with the coupling-shank, substantially as shown and set forth.

3. Hose composed of canvas or equivalent material and rubber, provided with a tube making part of the same, and vulcanized in such form and shape as to cover but not be attached to the end of the hose, substantially as shown and set forth.

In testimony whereof, we have signed our names to this specification before two subscribing witnesses.

J. P. RIDER.
JAMES R. BIRD.

Witnesses:
WM. H. NEKIN,
HENRY V. DE MOTT.